United States Patent
Nelson

(10) Patent No.: US 6,658,397 B2
(45) Date of Patent: Dec. 2, 2003

(54) COMPUTER METHOD AND APPARATUS FOR STORING AND REPRODUCING HANDWRITTEN CHARACTERS

(76) Inventor: Edward J. Nelson, 6025 Copely La., McLean, VA (US) 22101

(*) Notice: Subject to any disclaimer, the term of this patent is extended or adjusted under 35 U.S.C. 154(b) by 40 days.

(21) Appl. No.: 09/899,930

(22) Filed: Jul. 9, 2001

(65) Prior Publication Data

US 2002/0067853 A1 Jun. 6, 2002

Related U.S. Application Data

(63) Continuation of application No. 08/419,921, filed on Apr. 11, 1995, now Pat. No. 5,677,997.

(51) Int. Cl.[7] ............................................. G06N 3/08
(52) U.S. Cl. ..................... 706/20; 382/181; 382/186; 382/189; 382/254
(58) Field of Search ..................... 706/20; 382/181, 382/186, 189, 254

(56) References Cited

U.S. PATENT DOCUMENTS

| | | | | |
|---|---|---|---|---|
| 5,926,565 A | * | 7/1999 | Froessl | 382/181 |
| 6,002,799 A | * | 12/1999 | Sklarew | 382/189 |
| 6,069,978 A | * | 5/2000 | Peairs | 382/254 |
| 6,327,386 B1 | * | 12/2001 | Mao et al. | 382/186 |

* cited by examiner

Primary Examiner—Wilbert L. Starks, Jr.
(74) Attorney, Agent, or Firm—Hunton & Williams LLP

(57) ABSTRACT

A computer system operable in two modes for creating and selectively reproducing an individual's handwriting allows a user to produce text such as by word processing and display that text in their own handwriting. In a Create mode, the user separately inputs the characters of a character set in their own handwriting into a computer system. The input characters are then stored in a memory of the computer system. Each store character is associated with a key stroke on a keyboard. In a Reproduce mode, a desired character of the character set can be reproduced in the individual's handwriting by actuating the key stroke on the keyboard associated with the desired character.

12 Claims, 2 Drawing Sheets

COMPUTER METHOD AND APPARATUS FOR STORING AND REPRODUCING HANDWRITTEN CHARACTERS

CROSS-REFERENCE TO RELATED APPLICATIONS

The present application claims priority as a continuation application from U.S. Patent Application Ser. No. 08/419,921, which was filed on Apr. 11, 1995 now U.S. Pat. No. 5,677,997.

BACKGROUND

1. Field of the Invention

This invention relates to a method and apparatus for printing of graphical representations of handwritten characters.

2. Background of the Invention

Computer systems, such as word processors can accept text input through a keyboard and display or print out the text in any of a number of predefined character sets (fonts) stored in computer hardware. The general operation of such a system proceeds as follows. A user inputs desired text using the keyboard of a computer terminal or PC. When the user of a computer system actuates a keystroke on a keyboard a code is generated. As used throughout this application, a keystroke is the actuating of one or more keys on a keyboard in order to produce a particular character. Typically this code is an ASCII code. This character code serves as an address (or a portion of an address) to access a memory location in computer memory at which is stored display data associated with the keystroke. When desired, this display data can be displayed on a display. In this way, a character corresponding to a keystroke is displayed on the display. Similarly, the character code can be used to access printer control signals and thereby control a printer to print a character corresponding to the character code.

Some computer systems are capable of displaying or printing in a number of predefined fonts. One way this is done by storing the different fonts in different tables in computer memory. To access different fonts, a prefix is generally added to the character code produced by the keystroke. This prefix denotes a specific table storing a particular font. Nevertheless, the range of fonts available is generally limited to those that are predefined in the system.

SUMMARY OF THE INVENTION

It is an object of the present invention to allow the user of a computer system to display or print graphical representations of the user's own handwriting.

An embodiment of the present invention comprises a method for creating and selectively reproducing characters in a character set in an individual's own handwriting. In a Create mode, the characters of the character set are separately input into a computer system in an individual's own handwriting. The input characters are converted to digital form and stored in a memory of the computer system. Each of the stored characters is then associated with a keystroke on a keyboard. In a Reproduce mode a desired character of the character set may be reproduced in the individual's handwriting by actuating the key stroke on the keyboard associated with the desired character.

Another embodiment of the present invention comprises a computer system for creating and selectively reproducing characters in a character set in an individual's own handwriting. The system operates in a Create mode and a Reproduce mode. As part of the Create mode, the computer system comprises means for separately inputting into the computer system characters of a character set written in an individual's own handwriting. A memory is provided for storing the input handwritten characters. The computer system also includes means for associating each stored character with a key stroke on a keyboard. In a Reproduce mode, the computer system includes a display allowing a desired character of the character set to be displayed in the individual's own handwriting by actuating the key stroke on the keyboard associated with the desired character.

Other objects features and advantages will be apparent when the drawings and detailed description are considered.

DETAILED DESCRIPTION

An embodiment of the present invention is directed to a method for selective reproduction of an individual's handwriting to allow an individual to personalize the output of a computer system. Such a method is useful in a number of different environments. One example of an environment in which such a system could be useful is where an individual has a disease which is debilitating hand motion. The present invention would allow such an individual to capture their handwriting while they are still capable and reproduce it at will thereby preserving their handwriting.

In one embodiment the invention is directed to a method for allowing an individual to create and reproduce characters in the individual's own handwriting. This embodiment operates on a computer system capable of operating in a Create mode and a Reproduce mode. In the Create mode an individual inputs characters in the individual's own handwriting for storage into the computer system. In the Reproduce mode the computer system operates as a word processor except that it may display (e.g., on a CRT display, LCD display, hardcopy etc.) text in the handwriting of any individual who has stored their handwriting via the Create mode. The Reproduce mode of operation of the system is the default mode. This method allows a user to store their handwriting as a font.

Figure 1:
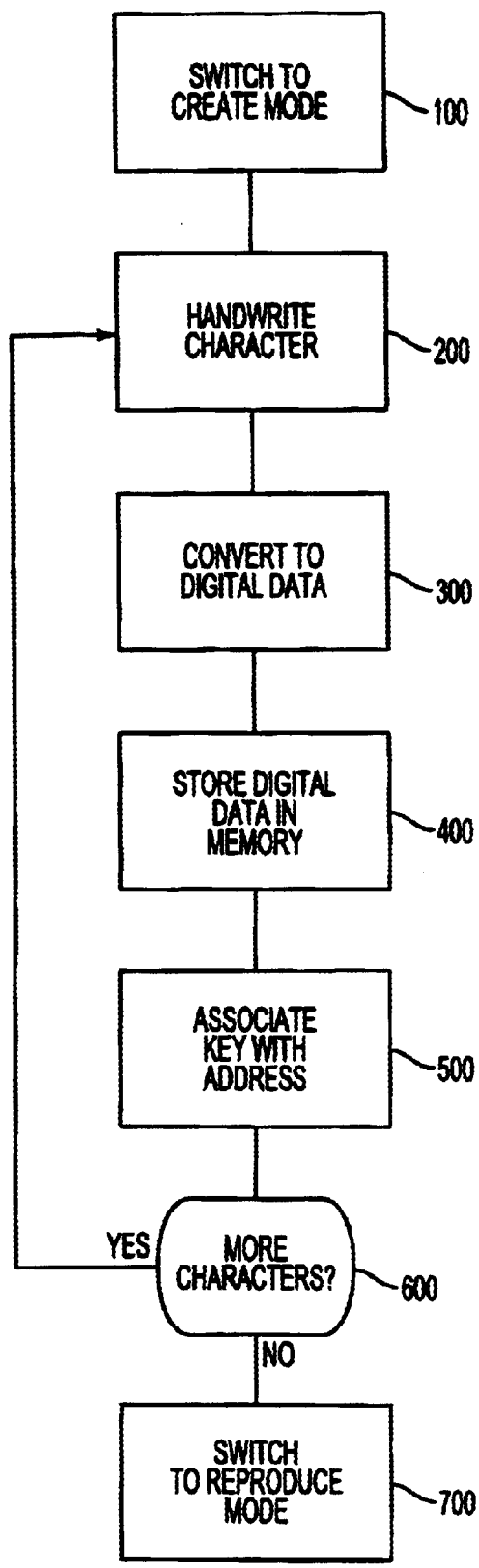
FIG. 1 depicts a flow chart of one embodiment of a method of the present invention.

An embodiment of a method according to the present invention is depicted in FIG. 1. As the operation of word processors is generally known, FIG. 1 shows one method by which the Create mode operates. In step 100, an individual desiring to create a font in their own handwriting switches the system out of the Reproduce mode and into the Create mode. In step 200, the individual separately enters characters into the system in their own handwriting. This character entry may be accomplished through the use of a digitizing pad, scanner or any other interface by which graphic data can be input to a computer system. In step 300, the input handwritten character is converted to digital data. This step is accomplished in any of a number of ways and depends on the method used to input the characters. By way of example, if a digitizing pad is used to input the character, as the input pen passes over the pad, discreet points on the matrix of the pads surface are set high thereby creating a matrix of digital data. In step 400, the digital data is stored in memory of the computer system at an addressable location. The address location at which the digital data is stored is then associated with a key stroke on a computer keyboard in step 500. In step 600 it is determined whether or not there are more characters to be entered. If there are more characters to be entered, operation returns to step 200. If all characters of a font have been entered, or the user has entered all of the characters desired, operation proceeds to step 700 and the Reproduce mode.

Steps 200–500 of the method operate in concert so that a handwritten font may be defined in a "user-friendly" manner. The entry and association of handwritten characters with a keystroke can take place in a number of different ways. In one preferred embodiment, the steps 200–500 begin with the system prompting the user (by way of an indication on a display) for entry of what is traditionally the first letter of a font and would proceed through all of the alphabetic and numeric characters of the font and then through the typographical symbols. As each character is entered, the system internally associates the character with a key stroke on the keyboard (i.e. "shift a" for uppercase "A", "a" for lowercase "a"). By way of example, if the individual desired to print their own handwriting in the English language, the character entry would begin with an uppercase "A" followed by a lowercase "a," and would move through the alphabet to upper and lowercase "Z." Entry would then proceed to the numbers 0–9 and the typographical symbols such as the period, comma and open and closed quotation marks. Throughout this process, the system prompts the user for each successive character or symbol and internally associates the entered character or symbol with its usual key stroke. One advantage of this embodiment is that it can assure that a complete set of characters and symbols are entered for a particular font. That is, the system continues to prompt the user to enter additional characters or symbols until entry of all characters of the font has been completed. If the user specifically chooses to exit the Create mode before entry is completed, the system may indicate that entry has not been completed.

According to another embodiment, steps 200–500 proceed by the system prompting the user for entry of any character or combination of characters. The user then enters the character(s) and indicates to the system that entry is complete such as by hitting "enter." In response to the user's indication that entry of the character has been completed the system would digitize the character(s) as above and would then prompt the user for the key stroke(s) to be associated with the entered character(s). When the user actuates the desired key stroke(s) to be associated with the entered character(s), the system stores the digital data associated with the entered character(s) at a location in memory associated with the user indicated key stroke. One advantage of this method of entering a font is that it allows the user to associate characters to key strokes in any way and would make possible such things as creating coded text. If plural characters are entered, words, names, and other collections of characters can be stored. The foregoing are only two embodiments of how steps 200–500 could be carried out. Other embodiments are contemplated and within the scope of the invention.

Figure 2:
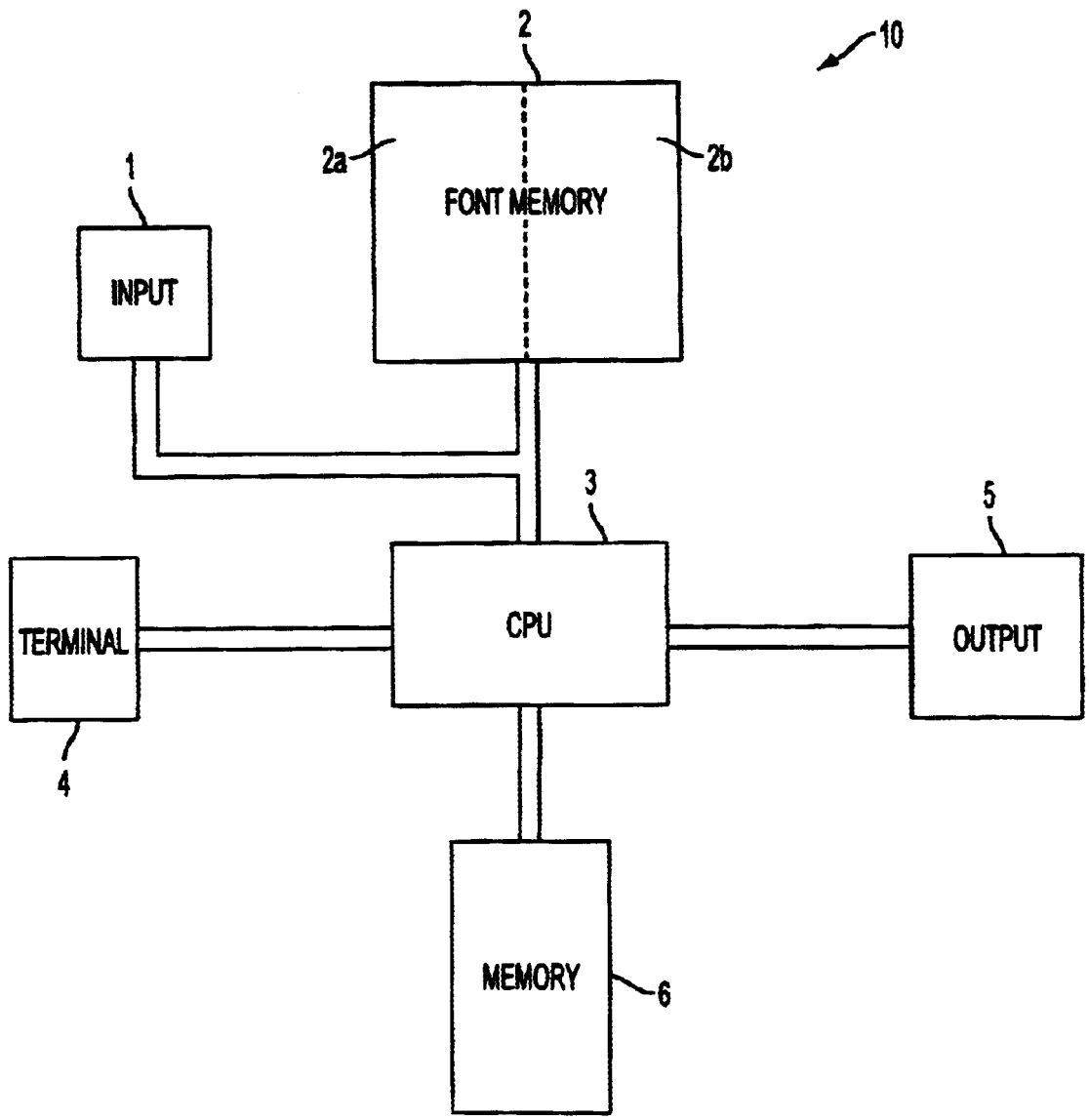
FIG. 2 depicts a block diagram of one embodiment of a computer system according to the present invention.

An embodiment of a computer system 10 to carry out the above methods is shown in FIG. 2. The system 10 includes a character entry device 1, a font memory 2, a CPU 3, a terminal 4 (including a keyboard and/or a mouse and a display), an output 5 and system memory 6. Operation of the system will now be briefly described with reference to the elements 1 to 6 and steps 200–500 of the Create mode shown in FIG. 1.

The Create mode begins with the system prompting the user (through display of terminal 4) for the entry of a character into the computer system in step 200 of FIG. 1. The prompt is generated by way of the CPU 3 running the system program stored in system memory 6. The prompt is answered by the user through keyboard of terminal 4 and character entry is accomplished by way of character entry device 1. Character entry device 1 may be a digitizing pad or scanner or any other suitable input device that converts a graphic entry into-digital data suitable for entry into the computer system in accordance with step 300 of FIG. 1.

Once a character is entered and digitized it is stored in font memory 2. In this embodiment the font memory is shown as having parts 2a and 2b. Fonts are typically stored in computer memory in read only memory (ROM) so as to assure their preservation. Part 2a in FIG. 2 represents traditional ROM font memory. In order to enable a user to create and store their own fonts in accordance with the method of FIG. 1, the system should have memory space which is capable of being written to. Part 2b in FIG. 2 represents such a memory space. Memory space 2b may be constructed on any type of memory which may be written to such as RAM, PROM, EPROM etc. In another embodiment, the entire font memory 2 is constructed of writable memory.

Upon completion of the Create mode, a user may operate the system 10 in the Reproduce mode as a word processor with the ability to display text on display of terminal 4 and output text on output 5 in the user's own handwriting. The output 5 can be any printer or any output used with word processors.

Although a detailed description of the present invention has been provided, it should be understood that the scope of the invention is not to be limited thereby, but is to be determined by the claims which follow. Various modifications and alternatives will be readily apparent to one of ordinary skill in the art.

I claim:

1. A method of selectively reproducing an individual's handwriting in a computer system operable in a Create mode and a Reproduce mode, the Create mode comprising:

separately inputting characters in an individual's handwriting into a computer system;

storing the input characters in a memory of the computer system; and, associating each stored character with one or more key strokes on a keyboard;

the Reproduce mode comprising:

reproducing a desired character of the character set in the individual's handwriting by actuating the key stroke on the keyboard associated with the desired character.

2. The method of claim 1 wherein the step of separately inputting comprises handwriting each character on a digitizing medium one character at a time.

3. The method of claim 1 wherein the step of separately inputting comprises handwriting each character on a medium one character at a time and scanning the medium.

4. The method of claim 1 wherein the step of storing the input characters comprises separately storing each input character in an addressable location in the memory of the computer system.

5. The method of claim 4 wherein the step of associating each character with a key on a keyboard comprises associating each addressable location with a code produced by actuating one or more keys on a keyboard.

6. The method of claim 1 wherein the step of separately inputting comprises separately inputting each character of a character set.

7. A computer system for storing and selectively reproducing an individual's handwriting comprising:

means for separately inputting handwritten characters, the characters being written in an individual's own handwriting into the computer system;

a memory for storing the input handwritten characters;

means for associating each stored character with a key stroke on a keyboard;

a display for displaying a desired character in the individual's own handwriting by actuating the key on the keyboard associated with the desired character.

8. The computer system of claim 7 wherein the means for separately inputting comprises a digitizing pad.

9. The computer system of claim 8 wherein the means for associating each stored character with a key stroke on a keyboard comprises means for associating each stored character with one of the plurality of addressable locations in computer memory;

wherein actuating a key stroke on the keyboard produces a code which addresses the memory and thereby accesses a character associated with the key stroke actuated.

10. The computer system of claim 7 wherein the means for separately inputting comprises a scanner.

11. The computer system of claim 7 wherein the memory for storing the input characters comprises computer memory having a plurality of addressable locations and capable of being written to and read from.

12. The computer system of claim 7 wherein the means for associating each stored character with a key stroke, is adapted to associate each stored character with one character of a character set.

* * * * *

UNITED STATES PATENT AND TRADEMARK OFFICE
CERTIFICATE OF CORRECTION

PATENT NO.        : 6,658,397 B2  
APPLICATION NO. : 09/899930  
DATED             : December 2, 2003  
INVENTOR(S)      : Nelson It is certified that error appears in the above-identified patent and that said Letters Patent is hereby corrected as shown below:

On the Title Page, Item -63- after Apr. 11, 1995, please delete [, now Pat. No. 5,667,997].

Signed and Sealed this

Twenty-sixth Day of August, 2008

JON W. DUDAS  
*Director of the United States Patent and Trademark Office*